(12) United States Patent
Nasr

(10) Patent No.: US 6,565,750 B2
(45) Date of Patent: May 20, 2003

(54) TRICKLING FILTER SYSTEM FOR BIOLOGICAL NUTRIENT REMOVAL

(75) Inventor: Sami M. Nasr, Davidsonville, MD (US)

(73) Assignee: O'Brien & Gere Engineers, Inc., East Syracuse, NY (US)

( * ) Notice: Subject to any disclaimer, the term of this patent is extended or adjusted under 35 U.S.C. 154(b) by 0 days.

(21) Appl. No.: 09/945,189

(22) Filed: Aug. 31, 2001

(65) Prior Publication Data

US 2002/0074286 A1 Jun. 20, 2002

Related U.S. Application Data

(60) Provisional application No. 60/229,433, filed on Aug. 31, 2000.

(51) Int. Cl.⁷ .................................................. C02F 3/30
(52) U.S. Cl. ........................ 210/605; 210/616; 210/623; 210/150; 210/260; 210/903
(58) Field of Search ............................... 210/605, 615, 210/616, 617, 623, 150, 151, 195.1, 195.3, 202, 220, 259, 903, 260

(56) References Cited

U.S. PATENT DOCUMENTS

| | | | |
|---|---|---|---|
| 3,622,508 A | * | 11/1971 | Komline |
| 3,777,891 A | | 12/1973 | Stengelin |
| 3,953,327 A | | 4/1976 | Parker |
| 4,042,494 A | * | 8/1977 | Stoyer |
| 4,056,465 A | | 11/1977 | Spector |
| 4,162,153 A | | 7/1979 | Spector |
| 4,271,026 A | | 6/1981 | Chen et al. |
| 4,351,729 A | | 9/1982 | Witt |
| 4,370,234 A | | 1/1983 | Marsland |
| 4,415,454 A | | 11/1983 | Fuchs |
| 4,479,876 A | * | 10/1984 | Fuchs |
| 4,522,722 A | | 6/1985 | Nicholas |
| RE32,429 E | | 6/1987 | Spector |
| 4,800,021 A | * | 1/1989 | Desbos ........................ 210/605 |
| 5,182,021 A | | 1/1993 | Spector |
| 5,211,847 A | | 5/1993 | Kanow |
| 5,258,121 A | | 11/1993 | Jordan et al. |
| 5,316,682 A | | 5/1994 | Keyser et al. |
| 5,342,522 A | | 8/1994 | Marsman et al. |
| 5,380,438 A | | 1/1995 | Nungesser |
| 5,482,630 A | | 1/1996 | Lee et al. |
| 5,582,733 A | * | 12/1996 | Desbos et al. |
| 5,601,719 A | * | 2/1997 | Hawkins et al. |
| 5,611,927 A | | 3/1997 | Schmid |
| 5,618,412 A | * | 4/1997 | Herding et al. ............. 210/150 |
| 5,626,754 A | | 5/1997 | Ballnus |
| 5,658,458 A | | 8/1997 | Keyser et al. |
| 5,733,455 A | | 3/1998 | Molof et al. |
| 5,807,484 A | | 9/1998 | Courture et al. |
| 5,824,222 A | | 10/1998 | Keyser et al. |
| 5,961,830 A | | 10/1999 | Barnett |
| 5,972,219 A | * | 10/1999 | Habets et al. ............... 210/604 |
| 6,183,643 B1 | * | 2/2001 | Goodley |
| 6,325,933 B1 | * | 12/2001 | Nielsen et al. |
| 6,444,125 B2 | * | 9/2002 | Han ........................... 210/605 |

FOREIGN PATENT DOCUMENTS

EP 0504019 * 9/1992

* cited by examiner

*Primary Examiner*—Fred Prince
(74) *Attorney, Agent, or Firm*—George R. McGuire; Hancock & Estabrook, LLP

(57) ABSTRACT

The present invention provides a two stage process for treating wastewater that subjects the influent to anoxic and oxic filtering processes. The first stage performs anoxic nitrification i.e., the conversion of nitrate to nitrogen gas by bacteria operating in the absence of oxygen. Influent (effluent from the primary clarifiers) is fed into the bottom of the anoxic dentirification tank, preventing contact with the atmosphere and thus reducing the amount of unwanted dissolved oxygen. The influent passes upwards through a layer of sludge biomass before contacting bacteria coated media which performs the denitrification process. This arrangement permits the influent to contact the sludge and the biomass to circulate through the filter, enhancing deoxygenation and the performance of the system.

3 Claims, 2 Drawing Sheets

TRICKLING FILTER SYSTEM FOR BIOLOGICAL NUTRIENT REMOVAL

This application claims the benefit of U.S. Provisional Application No. 60/229,433 filed Aug. 31, 2000.

BACKGROUND OF THE INVENTION

The present invention relates generally to wastewater treatment facilities, and more particularly to trickling filter systems for removing biological nutrients from the wastewater.

Wastewater treatment facilities use a variety of processes for cleaning and treating the wastewater influent they receive. One common process that is used is referred to as a trickling filter process, and one such type of process involves capturing the influent in a clarifying tank for initial processing, passing the influent to an anoxic filter tank for converting nitrates present in the influent into nitrogen gas, and then passing the influent to an oxic filter tank where ammonia can be converted into nitrates. A final clarifying tank is then used to treat any remaining nitrogen and phosphorous compounds before passing the effluent back to lakes, rivers, and other water supplies.

The anoxic stage of the process is most effective when the influent's exposure to the atmosphere is minimized. However, the influent is generally dumped into the anoxic tank from above, thereby briefly exposing it to atmosphere. After it is dumped into the tank, the influent proceeds to trickle through bacteria-coated media that are submerged in the tank. The bacteria rely on the nitrates and phosphorous in the wastewater for sustenance and then release nitrogen gas into the effluent. A sludge biomass accumulates on the bottom of the tank which further treats the wastewater as it passes therethrough and prior to it passing to the oxic stage of the process.

It is a principal object and advantage of the present invention to provide a system and method for reducing the amount of atmosphere to which wastewater influent is introduced during treatment in an anoxic filter tank.

It is a further object and advantage of the present invention to provide a wastewater treatment system that is energy efficient and therefore cost effective to implement and operate.

It is an additional object and advantage of the present invention to provide a wastewater treatment system that may be retrofit into existing facilities.

Other objects and advantages of the present invention will in part be obvious. And in part appear hereinafter.

SUMMARY OF THE INVENTION

In accordance with the foregoing objects and advantages, the present invention provides a two stage process for treating wastewater that subjects the influent to anoxic and oxic filtering processes. The first stage performs anoxic nitrification i.e., the conversion of nitrate to nitrogen gas by bacteria operating in the absence of oxygen. Influent (effluent from the primary clarifiers) is fed into the bottom of the anoxic dentirification tank, preventing contact with the atmosphere and thus reducing the amount of unwanted dissolved oxygen. The influent passes upwards through a layer of sludge biomass before contacting bacteria coated media which performs the denitrification process. This arrangement permits the influent to contact the sludge and the biomass to circulate through the filter, enhancing deoxygenation and the performance of the system.

The denitrified wastewater flows over weirs positioned at the top of the tank where it proceeds to the oxic stage of the process. The second stage involves the use of a traditional trickling filter to convert ammonia to nitrates in the presence of oxygen. This conversion occurs when bacteria coated media comes into contact with the wastewater while being ventilated with oxygen. The nitrates formed during this process are returned to the first stage for the final conversion into nitrogen gas.

BRIEF DESCRIPTION OF THE DRAWINGS

The present invention will be better understood and appreciated by reading the following Detailed Description in conjunction with the accompanying drawings, in which.

DETAILED DESCRIPTION

Figure 1:
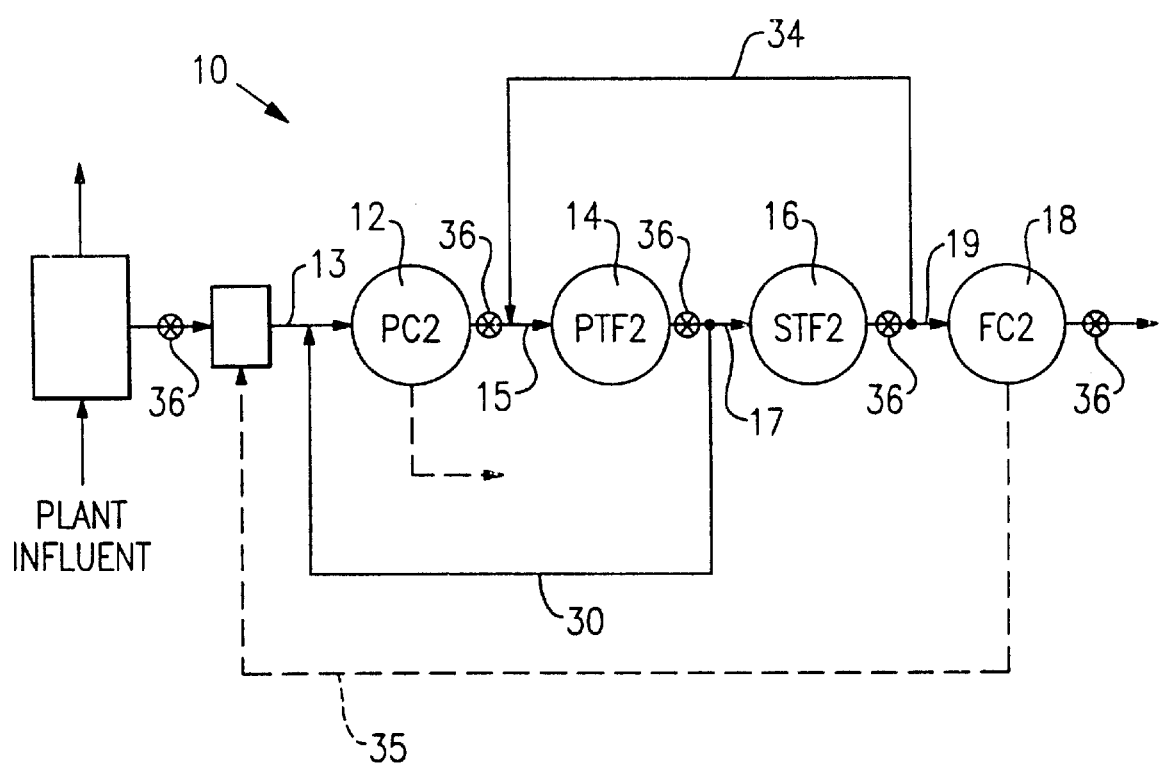
FIG. 1 is a high level flow chart showing the structure and operation of the present invention.

Referring now to the drawings, there is seen in FIG. 1 a wastewater treatment facility designated generally by reference numeral 10. The wastewater entering facility 10 generally contain nitrogen and phosphorous based nutrients that could be damaging to lakes, rivers, and other water sources if untreated. Facility 10 generally comprises primary clarifier tank 12 in which the wastewater influent is introduced via line 13 for initial clarification, a first stage of filter tanks 14 into which the influent is introduced via line 15 from clarifier tanks 12 for anoxic denitrification, and a second stage of filter tanks (traditional trickling filter tanks) 16 to which the influent is passed via line 17 from filter tanks 14 for oxic nitrification. Ultimately, the treated wastewater passes from trickling filter tanks 16 to final clarifier tanks 18 via line 19 and then the effluent is finally discharged.

Figure 2:
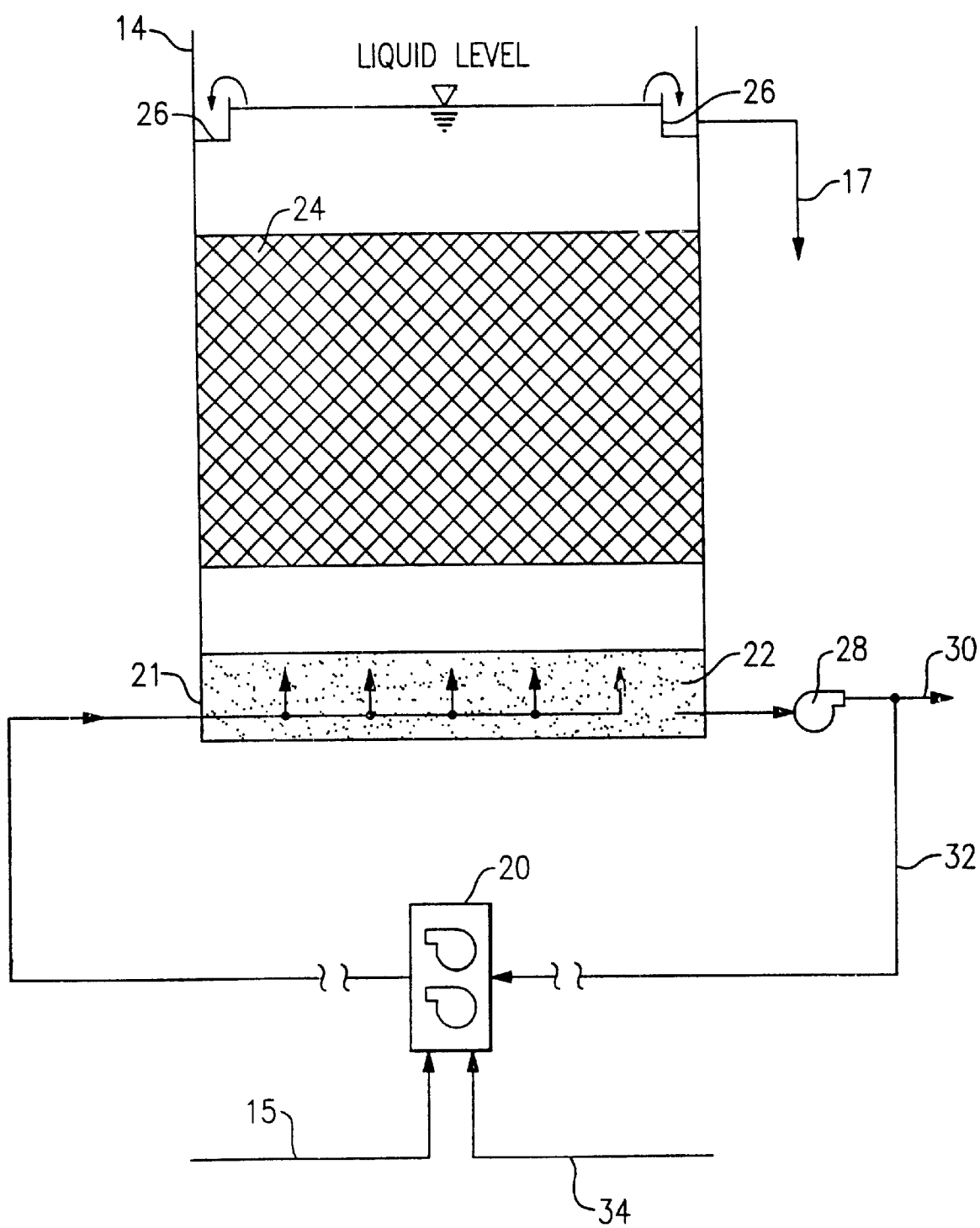
FIG. 2 is a schematic illustrating the anoxic denitrification filter process.

Referring to FIG. 2, a schematic of anoxic denitrification filter tank 14 is shown. Primary influent coming from clarifier tanks 12 proceeds through a pumping station 20 and through an inlet 21 formed through tank 14, adjacent its bottom. A sludge biomass 22 is positioned at the bottom of tank 14, thereby forcing the primary influent to migrate therethrough without first being exposed to atmosphere and thus reducing the amount of unwanted dissolved oxygen to which it is exposed. Once the influent passes through biomass 22, it then comes into contact with submerged media 24 which is coated with bacteria (preferably commercially available plastic media, but the more traditional rock media would also work). The bacteria coating media 24 performs the denitrification process, e.g., the nitrate in the influent is converted to nitrogen gas by the bacteria operating in the absence of oxygen. The influent then flows over weirs 26 and is piped to trickling filter tanks 16 via line 17.

In addition to the flow of influent through tank 14, as the sludge in biomass 22 thickens with waste product, it falls to the bottom of the biomass. The waste sludge is then removed from tank 14 by pump 28 which proceeds to pipe a portion of the sludge back to clarifier tanks 12 for further treatment via line 30, and recycles a portion of the sludge back to biomass 22 via line 32 and through pumping station 20. This continuous movement of biomass 22 ensures system efficiency by enhancing the deoxygenation of the sludge.

The influent that flows over weirs 26 and passes to traditional trickling filter tank 16 is then treated therein by trickling through bacteria coated media with ventilation provided by fans. The ammonia present in the influent is converted to nitrates by the bacteria operating in the presence of oxygen. The nitrates formed during this process are returned to tank 14 via line 34 for final conversion to nitrogen gas. The influent containing nitrogen gas present in tank 16 is passed to final clarifier tank 18 which clarify the wastewater for discharge as effluent. Any biosolids remaining in final clarifier 18 settle to the bottom and are recycled back to primary clarifier 12 via line 35 for further treatment.

Traditional sampling valves 36 are positioned between each stage of the process to permit samples of the influent to be tested.

What is claimed is:

1. A method of treating wastewater influent comprising the steps of:
   a. receiving said wastewater influent in a clarifying tank;
   b. passing said influent from said clarifier tank through an inlet positioned at the bottom of an anoxic filter tank having a sludge biomass positioned in contacting relationship to said bottom and a plurality of media coated with bacteria suspended above said biomass, wherein said influent flows upwardly through said anoxic filter tank;
   c. passing said influent from said anoxic filter tank to an oxic filter tank; and
   d. recirculating a portion of said influent that contains nitrates from said oxic filter tank to said anoxic filter tank, thereby converting said nitrates to nitrogen gas, and passing a portion of said influent that does not contain nitrates to a final clarifying tank.

2. An anoxic filter tank for use in a wastewater treatment process, comprising:
   a. an upstanding sidewall;
   b. a bottom connected to said sidewall, said bottom and sidewall collectively defining a cavity;
   c. a sludge biomass positioned within said cavity and in contacting relation to said bottom;
   d. a plurality of media coated with bacteria positioned within said cavity and in spaced relation above said sludge biomass;
   e. a liquid positioned within said cavity and submerging said media; and
   f. a wastewater inlet extending through said tank and positioned adjacent said bottom, wherein said wastewater influent flows into tank and upwardly through said sludge biomass prior to being treated by said media.

3. The anoxic filter tank of claim 2, wherein said plurality of media are composed of plastic.

* * * * *